(12) United States Patent
DeCicco

(10) Patent No.: US 6,680,596 B1
(45) Date of Patent: Jan. 20, 2004

(54) ELECTRIC MOTOR HAVING REGENERATIVE BRAKING

(75) Inventor: John DeCicco, Des Plaines, IL (US)

(73) Assignee: S-B Power Tool Corporation, Broadview, IL (US)

(*) Notice: Subject to any disclaimer, the term of this patent is extended or adjusted under 35 U.S.C. 154(b) by 0 days.

(21) Appl. No.: 10/268,553

(22) Filed: Oct. 10, 2002

(51) Int. Cl.⁷ .............................................. H01R 39/46
(52) U.S. Cl. ....................... 318/439; 318/138; 318/254; 318/376
(58) Field of Search ................................. 318/376, 375, 318/381, 759, 138, 254, 439; 310/212

(56) References Cited

U.S. PATENT DOCUMENTS

| | | |
|---|---|---|
| 4,250,436 A | 2/1981 | Weissman |
| 4,539,500 A | 9/1985 | Houben et al. |
| 5,294,874 A | 3/1994 | Hessenberger et al. |
| 5,332,954 A * | 7/1994 | Lankin ........................ 318/139 |
| 5,552,686 A | 9/1996 | Schmid et al. |
| 5,644,112 A | 7/1997 | Geiger et al. |
| 5,648,706 A * | 7/1997 | Polk et al. .................. 318/376 |
| 5,677,586 A | 10/1997 | Horst |
| 5,708,333 A | 1/1998 | Kirn |
| 5,789,885 A | 8/1998 | Seel |
| 5,791,057 A | 8/1998 | Nakamura et al. |
| 5,959,387 A | 9/1999 | Mowery et al. |
| 5,994,860 A | 11/1999 | Krueger et al. |
| 6,013,993 A | 1/2000 | Barbisch |
| 6,037,729 A | 3/2000 | Woods et al. |
| 6,094,023 A | 7/2000 | Ericsson |
| 6,104,155 A | 8/2000 | Rosa |
| 6,236,177 B1 | 5/2001 | Zick et al. |

FOREIGN PATENT DOCUMENTS

DE      195 40 740 C1     8/1996

\* cited by examiner

Primary Examiner—Karen Masih
(74) Attorney, Agent, or Firm—Greer, Burns & Crain, Ltd.

(57) ABSTRACT

An electric motor having a regenerative braking capability is described which has several embodiments, each of which utilize two pairs of brushes, each pair of which has individual brushes positioned on diametrically opposite sides of the commutator. One pair is positioned for preferably optimally running the motor while the other pair of brushes is used solely for braking purposes. For normal motor or running operation, a motor switch assembly interacts with an activating mechanism to physically lift the pair of braking brushes from the surface of the commutator and also ensures that the running brushes come into contact with the commutator. When the motor switch assembly is switched to stop the motor, the switch assembly causes the activating mechanism to first lift the running brushes from the surface of the commutator and then place the braking brushes onto the commutator surface.

19 Claims, 2 Drawing Sheets

ELECTRIC MOTOR HAVING REGENERATIVE BRAKING

BACKGROUND OF THE INVENTION

The present invention is generally directed to series wound motors for use in power tools, and more particularly to such motors that have a regenerative braking capability.

Series wound electric motors that are used in many applications, including electrical power tools have an operating characteristic that is generally considered to be undesirable, namely, the motors tend to exhibit a relatively long coast-down time after the power supply voltage to them has been switched off. In some applications such as circular saws, for example, brake stopping time may be relatively long after the motor has been switched off due to the inertia of the motor armature, the gearing, the shaft and the circular saw blade. This coast-down time is not only a nuisance for power tool users, it presents a potential risk of injury to an operator who is careless or impatient when using such a tool.

Because the coast-down characteristic has been recognized as a problem for decades, there have been attempts to provide mechanical as well as electrical braking systems for such motors. Known electronic braking systems for universal motors employ some type of regenerative braking technique, which is based upon the fact that all motors can exhibit generator characteristics. When a tool is switched off, therefore, the motor behaves similarly to a generator in that power is generated for as long as the armature keeps spinning and a magnetic field from the stator exists. Universal motors employing wound fields on the stator are not easily braked since the magnetic field quickly collapses upon switch-off, which is why regenerative braking is employed. At switch off, there is only enough residual magnetism to allow generator action to occur for a short time. However, if all or a portion of this initial generated power is fed back into the stator coils, by placing the coils across the generator output, the magnetic field of the stator is "regenerated" for as long as the tool keeps rotating. In placing the field coils across the armature to allow regeneration of the magnetic field, the field coils themselves act as the load which results in the braking torque. It is common for a resistive element to be placed in series with the field coils to limit high current spikes, adjust braking time, and improve the longevity of internal components.

One important aspect regarding regenerative brakes deals with the construction of the field coils or with the connection of the field coils to the armature. For regenerative braking to occur, the polarity of the magnetic field must remain the same for braking as it was for normal running (or motoring). This is achieved most commonly with either of two techniques: by interchanging the connections between the field and armature at switch off, or by using a second set of field coils at switch off for the purposes of braking, wherein this second set of coils is oppositely wound in the same stator slots as the normal motoring coils.

However, regenerative braking has its disadvantages. Although it was previously stated that all motors exhibit generator characteristics, most motors are poor generators. This is primarily due to the fact that motors and generators are constructed differently. Motors require a lead angle relative to a geometric neutral position against the direction of rotation whereas generators require a lead in the direction of rotation relative to the neutral position. In this regard, the geometric neutral position is a straight line that lies perpendicular to the field poles. This may differ from a magnetic neutral position which is the north/south magnetic axis of the armature which results when power is applied to a pair of brushes spaced 180° apart contacting the commutator.

If the same lead angle is employed during running and braking, there can be drastic consequences when a motor with a back lead is forced to brake using conventional regenerative techniques. At tool switch off, when the regenerative action occurs for accomplishing braking, a huge spark is often witnessed at the brush/commutator interface. This spark damages the brushes and the commutator and reduces the life of the motor. The spark occurs because the motor is optimized to run as a motor with a back lead and is then switched run as a generator which requires a forward lead.

A compromise may be implemented in a regenerative brake design, by lessening the motor lead in order to obtain acceptable braking. However, by lessening the motor lead, motor performance is sacrificed. It may also be necessary to ensure a stronger brush pressure on the commutator in order to achieve acceptable braking. But again, this has adverse effects on motor performance and motor life.

SUMMARY OF THE INVENTION

An electric motor having a regenerative braking capability is described which has several embodiments, each of which utilize two pairs of brushes, with each pair having individual brushes positioned on diametrically opposite sides of the commutator. One pair is positioned for preferably optimally running the motor while the other pair of brushes is used solely for braking purposes.

For normal motor or running operation, a motor switch assembly interacts with an activating mechanism to physically lift the pair of braking brushes from the surface of the commutator and also ensures that the running brushes come into contact with the commutator.

When the motor switch assembly is switched to stop the motor, the switch assembly causes the activating mechanism to first lift the running brushes from the surface of the commutator and then place the braking brushes onto the commutator surface.

DETAILED DESCRIPTION

The use of one pair of brushes during running and a separate pair for braking provides some distinct advantages compared to known prior art systems, including German Patent No. DE 195 40 740.7-32 which describes a system that uses a pair of brushes that can be oriented in such a way during running to achieve desirable performance; and when the tool is switched off, this same brush pair is then reoriented in a different position for obtaining desirable braking performance. Since one set of brushes is used for both running and braking, the brushes are subject to wear from conditions associated with both running and braking so overall brush life is lower than with the quad brush design embodying the present invention.

Since separate pairs of brushes are employed in the present invention, each brush pair can be optimized independently for both running and braking. Different brush geometries, brush compositions, brush spring pressure, angular placement or lead angle can be chosen to fully optimize brake and motor performance. In this regard, during running a lead angle relative to a geometric neutral position against the direction of rotation whereas generators require a lead in the direction of rotation relative to the neutral position. In this regard, the geometric neutral position is a straight line that lies perpendicular to the field poles. A lead angle for the running brushes can vary for optimum performance which will depend upon many design characteristics, and is generally within the range of about 7 degrees to about 40 degrees relative to geometric neutral in a direction opposite the direction of rotation. A lead angle for the braking brushes can also vary for optimum performance which will depend upon many design characteristics, and is generally within the range of about 7 degrees to about 40 degrees relative to geometric neutral in the direction of rotation.

This means that motor performance will not be sacrificed by the addition of a regenerative braking capability. Also, the spark which is typically seen at braking using conventional regenerative brakes is virtually eliminated, which leads to longer brush and commutator life. Having separate brushes used for braking contributes to longer brush life for both sets of brushes.

Another advantage is that brushes can be independently designed for either running or braking; so that optimal brush material, brush pressure, brush geometry, among other factors, can be chosen for each mode of operation.

Figure 1:
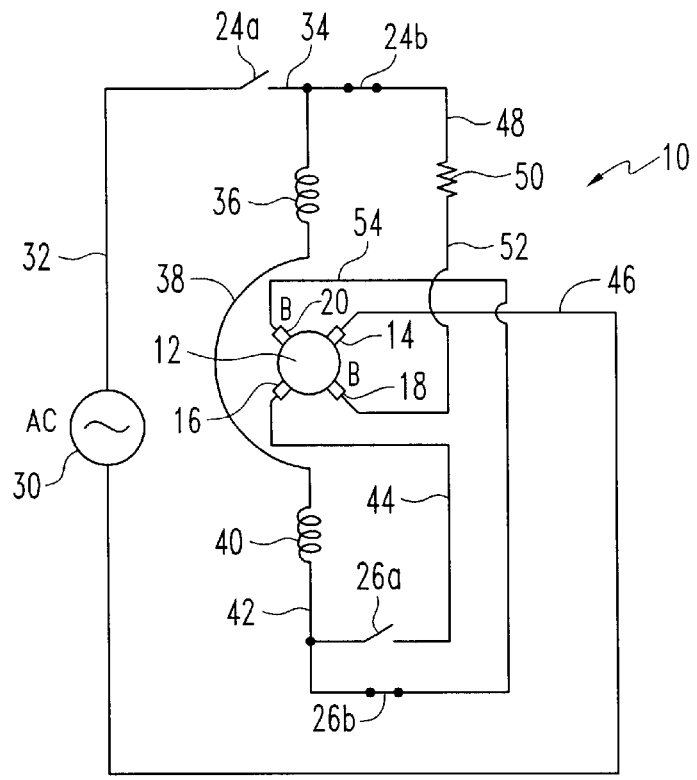
FIG. 1 is an electrical schematic diagram of a preferred embodiment of the motor embodying the present invention.

Turning now to the drawings and particularly FIG. 1 which illustrates an electrical schematic diagram of a preferred embodiment of the present invention which is a universal motor having an electronic regenerative brake which is configured to have four brushes that are adapted to be brought into selective contact with the commutator of the armature of the motor. The motor, indicated generally at 10, includes a rotatable armature having a commutator 12 of conventional design. A first pair of brushes 14, 16 are located on opposite sides of the commutator 12 and a second pair of brushes 18, 20 are also present. The pair of brushes 18, 20 operating in a regenerative braking circuit portion whereas the brushes 14, 16 are at a different lead angle relative to the outer periphery of the commutator 12 and the first and second sets of brushes are angularly positioned relative to one another in a manner that can produce optimal efficiency in the running of the motor as well as providing effective regenerative braking when desired.

Figure 4:
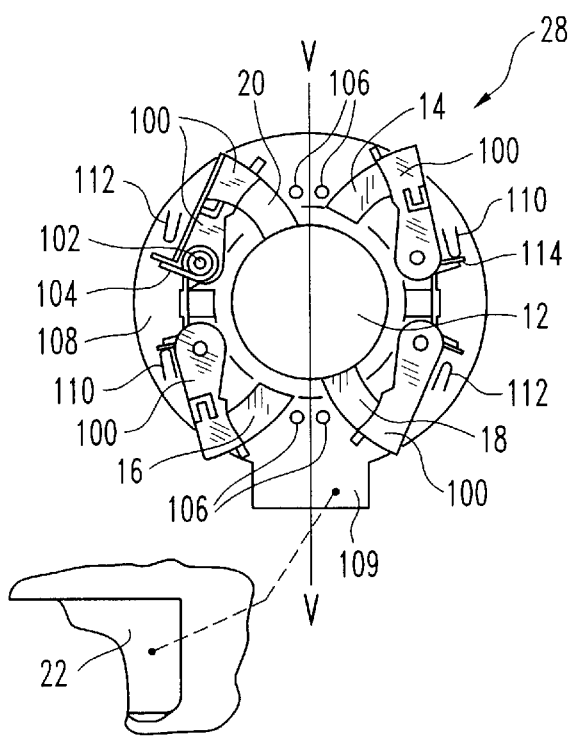
FIG. 4 is a plan view of structure that can be used to engage and disengage pairs of motor brushes used in the circuitry shown in FIGS. 1 and 2.

In this regard, and referring to FIGS. 1 and 4, the motor of the present invention is particularly suited for use in a portable hand tool, such as a drill, router, circular saw, miter saw, saber saw or other motorized hand tool which has a switch 22 for energizing the motor. The switch 22 has switch contacts 24a, 24b, 26a and 26b as well as a brush pair selection mechanism, indicated generally at 28 (FIG. 4), which is also interfaced with the trigger switch 22 and operates in a manner that will be hereinafter discussed in detail. The selection mechanism 28 is of the type shown and described in U.S. Pat. No. 4,539,500, which is specifically incorporated by reference herein.

During operation, when the motor is running, switch contacts 24a and 26a are closed and switch contacts 24b and 26b are open. An AC source 30 is connected to line 32 that extends to contact 24a which in turn is connected to line 34 that is connected to contact 24b and field coil 36, with the latter being series connected to line 38, field coil 40 and line 42, with line 42 being connected to both contacts 26a and 26b.

When contacts 26a are closed, energy is provided to line 44 that extends to brush 16, which together with brush 14 is in contact with the commutator 12. Brush 14 is connected to the AC source 30 by line 46. When the switch 22 is disengaged to de-energize the motor, the switch contacts 24a, 24b, 26a and 26b are in the positions shown in FIG. 1 and when in that de-energized position, the brushes 14 and 16 are lifted out of contact with the commutator and brushes 18 and 20 are placed in contact with the commutator. In this instance, contacts 24b are series connected to line 48, resistor 50 and line 52, which extends to the brush 18. Brush 20 is connected to line 54 that is connected to contact 26b.

For activating the regenerative braking action, the brushes 18 and 20 are lowered into contact with the commutator 12 and a closed loop through these brushes, the resistor, the field coils 36 and 40 is created which provides the regenerative braking action. It should be appreciated that the schematic diagram of FIG. 1 utilizes the field coils in both the running and braking operation. The resistor 50 in the braking circuit creates a load across the circuit loop which when not running as a motor and still spinning, behaves in a manner similar to a generator in that power is generated for as long as the tool keeps spinning. The resistor supplies a load across the generated power and results in a torque being produced which acts against the direction of rotation and causes the motor to come to a stop much more quickly. The resistor also has the effect of limiting high current spikes as well as adjusting the braking time and increasing the longevity of the internal component relative to what may occur were high current spikes permitted to occur.

It should also be understood that the preferred embodiment of FIG. 1 may be modified to remove the switch contacts 24b, 26a, and 26b from the circuit. In such a modified circuit, when the brake brushes 18 and 20 are lifted out of contact with the commutator, the braking circuit loop will be open circuited and no current flow will occur through lines 48, resistor 50, line 52, brake brushes 18 and 20, line 54, line 42, coils 36 and 40. However, if this modification is made, it may be important that the mechanism which lifts the brake brushes 18 and 20 from the commutator be appropriately mechanically timed with the operation of the AC line switch 22 so that switch contacts 24a and 26a are not closed before the brake brushes 18 and 20 are released from the commutator 12 contact.

Figure 2:
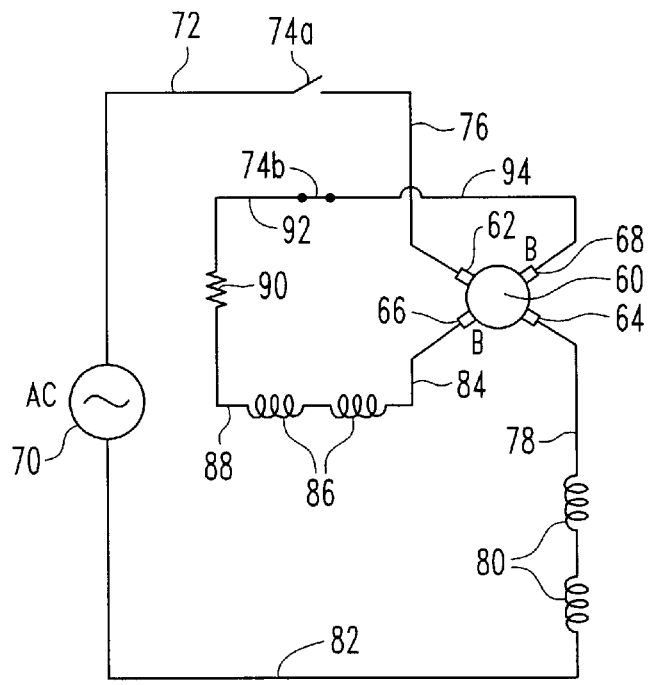
FIG. 2 is an electrical schematic diagram of an alternative embodiment of the motor embodying the present invention.

Another alternative embodiment is shown in FIG. 2 which includes an armature having a commutator 60 around the outer periphery thereof, with running brushes 62 and 64 and braking brushes 66 and 68 being provided in the manner in which the brushes 14, 16, 18 and 20 were described in connection with FIG. 1. An AC source 70 is connected via line 72 to switch contacts 74a, which are connected to brush 62 by line 76. The other running brush 64 is connected by line 78 to field coils 80 which in turn are connected by line 82 to the AC source 70. When the switch contacts 74a are closed by engaging the trigger switch 22 that also brings running brushes 62 and 64 into contact with the commutator 60, the motor will be energized. If the switch 22 is disengaged to deenergize the motor, the running brushes 62, 64 are lifted out of contact with the commutator 60 and braking brushes 66 and 68 are placed in contact therewith. When this occurs, brush 66 is connected by line 84 to a second set of braking field coils 86 which in turn are connected by line 88 to resistor 90 and line 92 that extends to a second set of contacts 74b, which in turn are connected to the brush 68 by line 94. Thus, the braking loop is activated in operation when the trigger switch 22 is released. In this alternative embodiment of FIG. 2 where separate running and braking coils are provided, the braking coils 86 and running coils 80 are oppositely wound to ensure the same magnetic field polarity at braking as just prior to braking.

It should also be understood that with regard to the switch 22, only the contact configuration is important and not the fact that only one switch is shown; i.e., the same contact arrangement can be achieved with one or more switches. Such implementations are known to one of ordinary skill in the art.

With regard to the activating mechanism 28 shown in FIG. 4, it may be used with any of the embodiments shown in FIGS. 1, 2 or 3, but it will be described in connection with the embodiment of FIG. 1. Turning to FIG. 4, brushes 14, 16, 18 and 20 are arranged around the commutator 12 with each brush being fixed in a brush holder 100, which is pivotable about a pin 102 and is biased by a spring structure 104 in the direction toward the commutator 12 with the spring 104 thus insuring the contact between a particular brush and the periphery of the commutator 12. Stops 106 on the motor housing plate 108 limits the maximum stroke of each holder caused by wear of the individual brush.

On the side of the commutator ring 12 is the activating mechanism formed by the plate 108 that is rotatable concentrically with the motor, with the plate being extended to form a handle 109 near the bottom thereof which is interconnected with the switch 22 of the tool. By means of the handle 109, the activating mechanism can be set in two different working positions so that corresponding brushes can be lifted from the commutator 12 by means of cams 110 and 112 that are associated with each brush. Each cam cooperates with an extension 114 on each holder 100 so that, for example, by turning the plate 108 so that the cams 110 are rotated in the clockwise direction, the upper right hand brush 14 and lower left hand brush 16 are lifted from the commutator 12. The other two brushes released by cam 112 are urged against the commutator ring 12 by means of the spring 104 associated with each holder 100. With this setting, the motor will be driven in the running mode. When the activating mechanism 28 is displaced in the opposite direction, the associated cams 112 will lift the upper left brush 20 and lower right brush 18 from the commutator 12 whereas the other two brushes 14 and 16 will be moved into contact against the commutator ring. With this setting, the motor will be placed in the braking mode.

Figure 3:
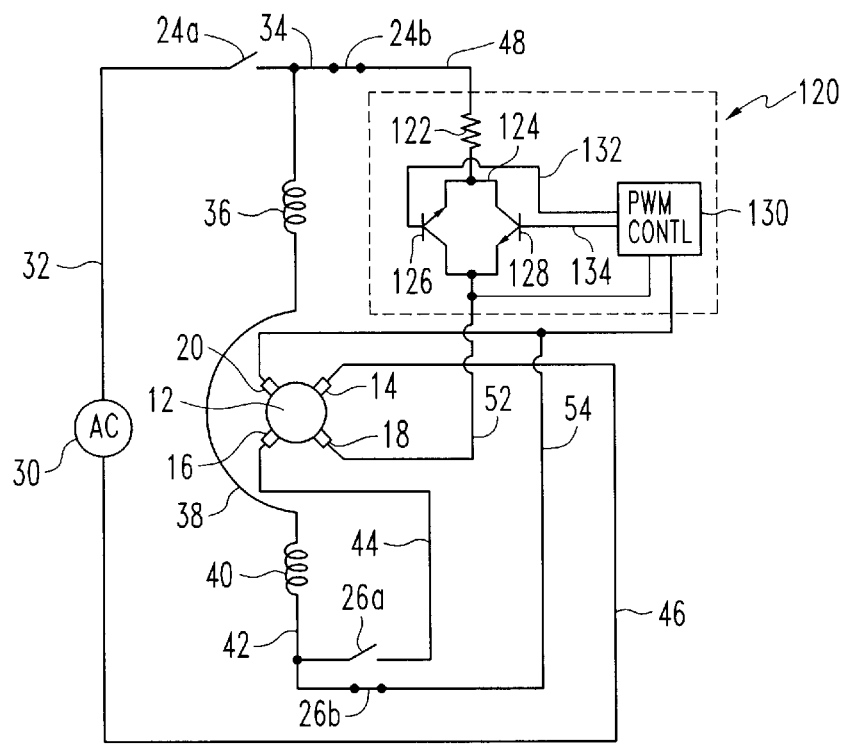
FIG. 3 is an electrical schematic diagram of a second alternative embodiment of the motor embodying the present invention.

In yet another alternative embodiment of the present invention, and referring to FIG. 3, it is similar to the embodiment shown in FIG. 1, except that the resistor 50 in the braking circuit is replaced by a switching module 120 shown within a dotted box. All components having reference numbers in FIG. 3 that identical to those shown in FIG. 1 provide the same operation. The module 120 is shown as including a resistor 122 that may or may not be necessary depending upon whether the armature windings and field windings 36, 40 provide enough resistance not to destroy the other circuit components in the module 120. The resistor 122, if provided is connected to line 124 that extends to the emitter of a NPN transistor 126 and to the collector of a transistor 128, with the collector of transistor 126 and the emitter of transistor 128 being connected to line 52. Lines 52 and 54 extend to a pulse width modulated controller 130 that may be an integrated circuit or a microprocessor which has output lines 132 and 134 that extend to the base junction of each transistor 126, 128. The controller operates to switch one of the transistors 126, 128 on and off at a rate that can be adjustably controlled. Generally, the higher the duty cycle of pulses produced, the faster the braking time.

During a braking operation, the timing of the release of the trigger switch 22 relative to the AC line cycle, affects the operation. When the switch 22 is released, the armature has a voltage across it and the polarity of that voltage depends upon when in the AC cycle you release the switch. So, if the voltage on brush 20 is minus and brush 18 is plus, the line 52 extending from the brush 18 to the transistors together with the output line 132 will switch transistor 126 on and off. It will be pulse width modulated, and during those instances when transistor 126 is on, current will go through that transistor 126, through resistor 122 (if present), through the normally closed switch contacts 24b, through the one field coil 36, line 38, the other field coil 40, through the other normally closed switch contacts 26b, and back to the brush 20.

If at the time of release of the trigger switch 22, the upper brush 20 is positive, current flows around the loop in the opposite direction, including down through the transistor 128 and then back to the brush 18. Since both of the lines 52 and 54 also extend to the controller 130, one of them will always be able to provide a positive voltage to power the controller. Thus, the controller 130 is being powered by the voltage being generated by the rotating armature, since releasing the switch 22 removes the AC power to the circuit While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A commutator electric motor having electrical braking capability for use in machine tools, the motor comprising:

a stator including one or more field windings;

an armature having windings and being rotatably mounted within said stator and a commutator mounted for rotation with said armature;

at least first and second pairs of brushes located on opposite sides of and adapted to be brought into physical contact with said commutator, said first pair of brushes being angularly displaced from said second pair of brushes;

an activating mechanism for selectively bringing one of said first or second pairs of brushes into physical contact with said commutator;

a drive circuit adapted to be powered by a power source for energizing the motor, said drive circuit including said first pair of brushes;

a regenerative brake circuit connected to said armature winding and to one field winding, which when activated, is adapted to establish a regenerative current flow across said commutator and said second pair of brushes;

at least one switch mechanism operable between a first position wherein said drive circuit is energized and said brake circuit is deactivated and a second position wherein said drive circuit is deenergized and said brake circuit is activated.

2. A motor as defined in claim 1 wherein said switch mechanism interacts with said activating mechanism to bring said first pair of brushes into contact with said commutator when said switch mechanism is in its first position and bring said second pair of brushes into contact with said commutator when said switch mechanism is in its second position.

3. A motor as defined in claim 1 wherein said brake circuit includes a means for limiting current flow therethrough during a braking operation.

4. A motor as defined in claim 3 wherein said current flow limiting means comprises a resistor.

5. A motor as defined in claim 3 wherein said current flow limiting means comprises a pair of parallel connected transistors that are switched to.

6. A motor as defined in claim 1 wherein said angular displacement of said first and second pairs of brushes is variable and is a function of factors including the intensity of braking action, with a greater angle providing more intense braking action.

7. A motor as defined in claim 1 wherein said angular displacement of said first and second pairs of brushes is within the range of about 14 degrees and about 70 degrees.

8. A motor as defined in claim 1 wherein the motor includes a second field winding and said brake circuit is connected to said second field winding.

9. A motor as defined in claim 8 wherein said second field winding is wound in the opposite direction relative to said first field winding.

10. A motor as defined in claim 1 wherein said machine tools are portable hand tools and said switch mechanism comprises a trigger switch.

11. A motor as defined in claim 1 wherein said switch mechanism has at least one set of normally open switch contacts between the power source and said drive circuit that are closed when said switch mechanism is in said first position and open when in said second position.

12. A motor as defined in claim 1 wherein said switch mechanism has at least one set of normally closed switch contacts between the power source and said brake circuit that are open when said switch mechanism is in said first position and closed when in said second position.

13. A universal electric motor having electrical braking capability for use in machine tools, the motor comprising:
a stator including one or more field windings;
an armature having windings and being rotatably mounted within said stator and a commutator mounted for rotation with said armature;
a drive circuit adapted to be powered by a power source for energizing the motor, said drive circuit including a first pair of brushes located on opposite sides of and adapted to be brought into physical contact with said commutator;
a brake circuit connected to said armature winding and to one field winding, which when activated, is adapted to establish a regenerative current flow across said commutator and a second pair of brushes located on opposite sides of and adapted to be brought into physical contact with said commutator, said second pair of brushes being angularly displaced from said first pair of brushes around the periphery of said commutator;
a switch mechanism operable between a first position wherein said drive circuit is energized, only said first set of brushes are in physical contact with said commutator, and said brake circuit is deactivated and a second position wherein said brake circuit is activated, only said second set of brushes is in physical contact with said commutator and said drive circuit is deenergized.

14. A motor as defined in claim 13 wherein the amount of angular displacement is determined by the design parameters of the motor, including the speed of braking that is desired, with the greater braking speed dictating a larger angular displacement.

15. A motor as defined in claim 14 wherein said amount of angular displacement varies within the range of about 14 degrees and about 70 degrees.

16. An electric motor having electrical braking capability, the motor comprising:
a stator;
an armature rotatably mounted within said stator;
a commutator mounted for rotation with said armature;
a drive circuit for energizing the motor, said drive circuit including a first pair of brushes located on opposite sides of said commutator;
a brake circuit for regeneratively braking the motor, including a second pair of brushes located on opposite sides of said commutator;
switching means operable between a first position wherein said drive circuit is energized, only said first set of brushes is in physical contact with said commutator, and said brake circuit is deactivated and a second position wherein said brake circuit is activated, only said second set of brushes is in physical contact with said commutator and said drive circuit is deenergized.

17. A motor as defined in claim 16 wherein said stator includes one or more field windings and said armature includes one or more windings.

18. A motor as defined in claim 16 wherein said second pair of brushes is angularly displaced from said first pair of brushes around the periphery of said commutator.

19. An electric motor having electrical braking capability, the motor comprising:
a stator;
an armature rotatably mounted within said stator;
a commutator mounted for rotation with said armature;
a drive circuit for energizing the motor, said drive circuit including a first pair of brushes located on opposite sides of said commutator and positioned at a first angle relative to an armature neutral position in a direction opposite the direction of rotation;
a brake circuit for regeneratively braking the motor, including a second pair of brushes located on opposite sides of said commutator and positioned at a second angle relative to the armature neutral position in the direction of rotation;
switching means movable between first and second positions wherein in said first position said drive circuit is energized, only said first set of brushes is in physical contact with said commutator, and said brake circuit is deactivated and wherein in said second position said brake circuit is activated, only said second set of brushes is in physical contact with said commutator and said drive circuit is deenergized.

* * * * *